Jan. 10, 1967  T. KLOTZ  3,296,714

MOLECULAR MODELS

Filed Sept. 4, 1964  4 Sheets-Sheet 1

INVENTOR.
THEODORE KLOTZ
BY
R. J. Frank
ATTORNEY.

Jan. 10, 1967     T. KLOTZ     3,296,714

MOLECULAR MODELS

Filed Sept. 4, 1964     4 Sheets-Sheet 2

INVENTOR.
THEODORE KLOTZ

BY R. J. Frank
ATTORNEY.

United States Patent Office 3,296,714
Patented Jan. 10, 1967

3,296,714
MOLECULAR MODELS
Theodore Klotz, Tappan, N.Y., assignor to Eastview Corporation, Pearl River, N.Y., a corporation of New York
Filed Sept. 4, 1964, Ser. No. 394,428
17 Claims. (Cl. 35—20)

This invention relates to educational apparatus and, in particular, to molecular models for simulating the heredity determining processes which take place within plant and animal cells.

One of the outstanding scientific advances in recent years has been the discovery of the mechanism which governs heredity. This aspect of biochemistry is now considered of such importance that it is being taught to increasingly large numbers of students at both the college and high school levels. While the subject is extremely interesting, it is also complex, and it has been found that the student often has difficulty in grasping the fundamental concepts and three-dimensional relationships involved. This is especially true when he must rely solely on written or orally presented material and on two-dimensional drawings to understand the interactions governing the division of cells and the manufacture of protein. Accordingly, I have invented a kit which will enable the user to construct scientifically accurate three-dimensional models of the molecular processes taking place within the cell.

According to presently accepted theory, the chromosomes found in the nucleus of cells contain within them genes which determine the physical characteristics of all living organisms. These genes are composed of long-chain molecules of nucleic acid which may be divided into two types: deoxyribonucleic acid (DNA) and ribonucleic acid (RNA). DNA is found only within the chromosomes whereas most of the RNA is located outsides the nucleus in the cytoplasm.

The structure of the DNA molecule is generally believed to be in accordance with that proposed by F. H. C. Crick and J. P. Watson in 1953. According to the Watson-Crick model, DNA is comprised of two intertwining strands forming an interlocking double helix oriented about a common central axis. The strands are composed of alternating units of a sugar (deoxyribose) and a phosphate (phosphoric acid) linked together by chemical bases attached to the sugar units. The bases are made up of the nitrogen-containing compounds purine and pyrimidine—the purines being adenine and guanine and the pyrimidines being cytosine and thymine. A molecular group consisting of a sugar unit having a phosphate unit attached to one side and a purine or pyrimidine compound to the other is called a nucleotide.

While there are four bases in the DNA molecule, it can be shown that only purine-pyrimidine bonds are possible and that bonds between a purine and a purine or between a pyrimidine and a pyrimidine are theoretically impossible. In fact, it has been found that an adenine is always joined to a thymine by a hydrogen bond and, similarly, a guanine is always connected to a cytosine by a hydrogen bond. Thus, the two halves of the DNA molecule are complementary—where a nucleotide in one half contains adenine the other half will have thymine and where the first half contains guanine the other will have cytosine. It is the order in which these pairs of bases are arranged in the DNA molecule that determines the genetic code.

When a cell divides, the DNA molecules making up the chromosomes replicate themselves by a process in which each half acts as a model for the new molecule. During division, the double helix splits at the purine-pyrimidine hydrogen bonds and free nucleotides (which are always present in the cell) join each half. The free nupcleotides couple to the nucleotides in the splitting DNA molecule in such a way that only adenine-thymine and guanine-cytosine bonds are formed. In addition, the sugar and phosphate units of the free nucleotides are joined together by covalent bonds once they have been positioned along the DNA chain, this reaction being catalyzed by an enzyme. As a result, two new DNA molecules are formed which are identical with the original molecule.

As previously mentioned, ribonucleic acid (RNA) also exits within the cell. RNA is quite similar to DNA except that the sugar deoxyribose is replaced by the sugar ribose and the base thymine by another pyrimidine, uracil. One form of RNA, termed "messenger-RNA," is formed within the nucleus by a replication process similar to that by which the DNA molecule is caused to split. The nucleotides in the messenger-RNA correspond to those in the DNA except for the substitution of uracil for thymine and the additional atom of oxygen in the sugar. The resultant messenger-RNA molecule, therefore, carries the same genetic code as the gene that formed it.

After it is formed, the messenger-RNA molecule breaks out of the nucleus and moves into the cytoplasm where it attaches itself to a ribosome. (A ribosome is a particle found in the cytoplasm which is made up of about half RNA and half protein.) The messenger-RNA is now in a position to direct the synthesis of protein by joining a number of amino acids to form a polypeptide chain. This is accomplished with the aid of another form of RNA, referred to as "transfer-RNA," which is small enough to be readily soluble in the cell fluid. There are a number of variations of transfer-RNA and each has the property that it will attach itself to a specific amino acid. In addition, each form of transfer-RNA has three bases from the group adenine, uracil, guanine and cytosine. The particular three bases comprising each transfer-RNA molecule corresponds to the specific amino acid with which the transfer-RNA molecule is associated.

After attaching to an amino acid, each transfer-RNA molecule migrates to a location on the messenger-RNA molecule having a base sequence corresponding to the complement of the triplet code on the transfer-RNA. When all the transfer-RNA molecules are in place along the polynucleotide chain of the messenger-RNA, the amino acids are in the correct order for enzymatic processes to bring about a reaction that combines them into a specific polypeptide chain corresponding to the desired protein.

From this brief summary, it can be seen that the molecular configurations of the nucleic acids and the processes involved in the formation of protein are not only quite complex, but are three-dimensional in nature. Accordingly, it is an object of my invention to provide a kit composed of components which are scientifically accurate representations of the constituents forming the nucleic acids and the other substances involved in the formation of protein.

Another object of my invention is to provide a kit composed of components which can be assembled to form accurate helically shaped models of nucleic acid molecules which will retain their helical form after assembly.

Still another object is to provide a kit for construction of nucleic acid molecules in which the components are easily assembled and identified and in which the opportunity for error in assembly is minimized.

Yet another object is to provide a kit which will enable the student to modify an assembled model of the nucleic acid molecule so as to simulate step-by-step the process which takes place during the actual replication of the molecules.

A further object is to provide a kit which will permit the step-by-step simulation of the formation of protein in accordance with the genetic code embodied in the DNA molecule.

A still further object is to provide a kit which is relatively inexpensive to produce and is therefore suitable for widespread use in schools and industry.

An additional object of my invention is to provide models of nucleic acid molecules.

In accordance with the present invention, there is provided a kit containing the components required for assembly of models of nucleic acid molecules and the polypeptide chains which form protein. The components which simulate the sugar units, deoxyribose and ribose of DNA and RNA respectively, are formed of elongated resilient members made of a suitable plastic material. The phosphate units are simulated by flexible elements which are short in comparison with those representing the sugar units and are adapted to be slipped over the ends of the sugar members. By combining alternate sugar and phosphate simulating members, strands comprising the sides of the model of the nucleic acid molecule are formed. (Hereinafter, the components of the kit which represent the sugar and phosphate units will, for simplicity, be referred to as sugar and phosphate members or elements respectively. Similarly, the other components of the kit will usually be described by the names of the chemicals they represent.)

The purine and pyrimidine base components are represented by elongated elements which are adapted for connection to the sides of the sugar members. Each of the purines-adenine and guanine, and the pyrimidines-cytosine, thymine and uracil, are represented by a component having a distinctive marking (such as a specific color) so that a replica of a molecule having the desired genetic code may be readily assembled. Further, the base elements are constructed so that only the bonds which actually occur in nucleic acids, i.e. adenine-thymine (or uracil) and guanine-cytosine, can be paired in assembling the model.

In a preferred embodiment of the invention, the sugar members are made of hollow cylinders of polyethylene, each having a hole drilled radially in the surface of the cylinder midway between its ends. The phosphate elements are hollow rubber cylinders of sufficient inside diameter to fit tightly over the ends of the sugar members. A strand of sugar-phosphate elements is assembled by partially inserting a short plastic pin representing a covalent bond in the bore of a sugar member, slipping a rubber phosphate element over each end of the sugar member, and then inserting new sugar members over the pin in each end and under the phosphate elements. This process is continued until a strand of the desired length has been formed. The base elements are also formed from hollow cylinders and are assembled to the sugar members and each other by plastic pins inserted in their bores. In addition to being of different colors for ease of identification, the members comprising one pair of base elements may be made the same length while those comprising the other pair are of unequal length. Since the total length of any two base elements must be equal to the distance between the helical strands, only the correct elements can be connected together in each pair.

When a model of a complete nucleic acid molecule is assembled, it may be twisted into a double helix representing the actual configuration of the molecule. Since each strand is represented by a set of discrete resilient sugar-simulating elements coupled by plastic pins and flexible elements simulating the phosphate units, the helix will retain its shape and will not tend to "unwind" or otherwise deform.

Molecules of transfer-RNA are simulated by three connected nucleotides each containing an element representing a ribose sugar unit, a phosphate unit, and a base unit. They are also keyed to receive a block representing a specific amino acid which corresponds to the base units. The amino acid members are adapted for receiving a connecting member which simulates the peptide link between the acids.

The above objects of and the brief introduction to the present invention will be more fully understood and further objects and advantages will become apparent from a study of the following description in connection with the drawings wherein.

Figure 1:
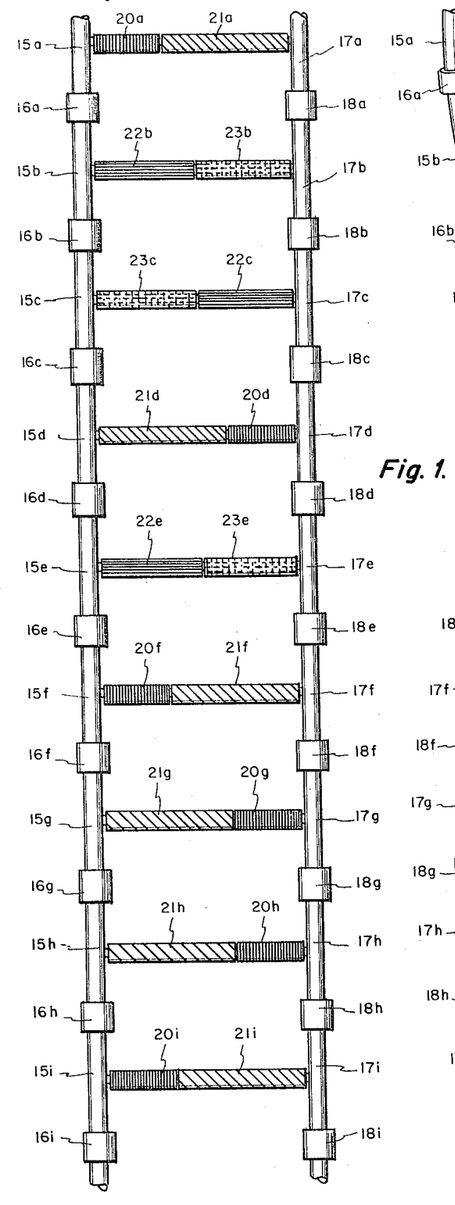
FIG. 1 shows a model of a DNA molecule before being twisted into a helix.

Referring to FIG. 1, there is shown a model of a DNA molecule assembled from the components of the kit. For clarity, the model is shown prior to being twisted into a helix corresponding to the actual configuration of the molecule. One of the elements making up the sides of the model is formed of elongated resilient hollow cylindrical members 15a to 15i which represent the sugar (deoxyribose) units. These sugar members are connected by short plastic pins 24 representing covalent bonds (see FIG. 3) which fit snugly within the bores of the cylinders. The phosphate units are simulated by relatively short flexible tubes 16a to 16i which slide over the ends of elements 15. Similarly, the other strand is composed of cylindrical sugar members 17a to 17i and phosphate elements 18a to 18i.

Sugar members 15 and 17 are preferably made of a plastic material such as polyethylene which is resilient enough to permit its longitudinal axis to be curved yet spring back when pressure is removed. Phosphate elements 16 and 18 are made of a flexible material, such as rubber, and are a fraction of the length of the sugar members.

A base element is joined to the center of each of the sugar cylinders 15 and 17. The bases are simulated by elongated hollow cylindrical elements of different length made preferably of a relatively unbreakable colored material such as butyrate or vinyl. These base units are joined in pairs, the element representing adenine always being coupled to an element representing thymine (or uracil) and an element simulating guanine always being joined to a cytosine element. In order to assure that the proper base elements will be connected together, they may all be of different lengths with the restriction that the total length of each pair is the same.

Alternately, as shown in FIG. 1, one pair may be made up of base elements having different lengths and the other pair of elements having the same length. For example, assuming that adenine is represented by the short base element 20, then the longest base element 21 represents thymine. The base elements which are the same length 22 and 23 represent guanine and cytosine respectively. As indicated by the shading of FIG. 1, the elements representing adenine, thymine, guanine, and cytosine are arbitrarily colored red, green, blue, and yellow respectively. Thus, the purine-pyrimidine bond between sugar units 15a and 17a is adenine-thymine as represented by base elements 20a and 21a. Similarly, sugar members 15b and 17b are coupled by guanine-cytosine elements 22b and 23b, sugar members 15c and 17c by cytosine-guanine elements 23c and 22c, sugar members 15d and 17d by thymine-adenine elements 21d and 20d, and so forth. It shall be understood that the particular bases shown in FIG. 1 are for illustration only and that the order in which the base elements are actually joined in constructing a model of a DNA molecule will be determined by the genetic code to be represented.

FIGS. 2a, 2b, 2c, 2d and 2e are perspective views of a sugar lement 15, a phosphate element 16, a base element 22, and two types of connecting pin 24 and 24'. The sugar element 15 is a hollow cylinder provided with a radial aperture 25 located midway between the ends of the element and a longitudinal bore 26 having the same diameter as aperture 25. The phosphate and base elements 16 and 22 (guanine) are also hollow cylinders having longitudinal bores 26 and 28 respectively. The other base elements are similar to element 22, except that element 20 (adenine) is shorter than element 22 (or 23) and element 21 (thymine) is longer.

Figure 2A:
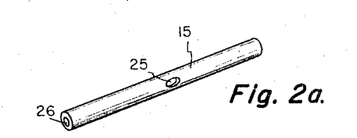
FIGS. 2a, 2b, 2c, 2d and 2e illustrate the components used in constructing the model.
Figure 2B:
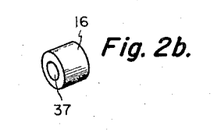
Figure 2C:
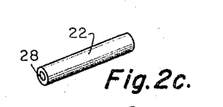
Figure 2D:
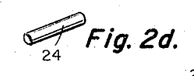
Figure 2E:
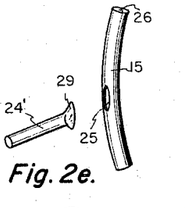

The connecting pin 24 has a diameter which enables it to fit snugly within the longitudinal bores of sugar elements 15 and base elements 20–23. The pin 24', which represents the bond between the base elements and the sugar members, is crimped at one end 29 as shown in FIG. 2e. Thus, the end 29 of pin 24' is not round but is flat and elongated, the width of the transverse elongated portion being greater than the normal diameter of aperture 25 in sugar member 15. Pin 24' is joined to sugar member 15 by bending member 15 to elongate hole 25 and then inserting the crimped end 29 in the hole. When member 15 is released it springs back to its normal position and pin 24' is held securely in place since the crimped end 29 is too large to pass through the unstretched hole.

Figure 3:
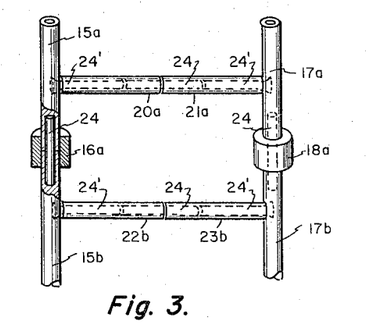
FIG. 3 shows details of assembling the model of FIG. 1.

FIG. 3 depicts details of the assembly of one portion of the DNA model of FIG. 1. As shown, the sugar members 15a, 15b and 17a, 17b are connected by pins 24 representing covalent bonds inserted within their bores, the phosphate elements 16a and 16b surrounding the ends of the sugar members. The base elements 20 to 23 are also joined to each other by pins 24 which represent relatively weak hydrogen bonds. The base elements are connected to the sugar units 15 and 17 by crimped pins 24' and extend at right angles to the longitudinal axes of the sugar members.

Figure 4:
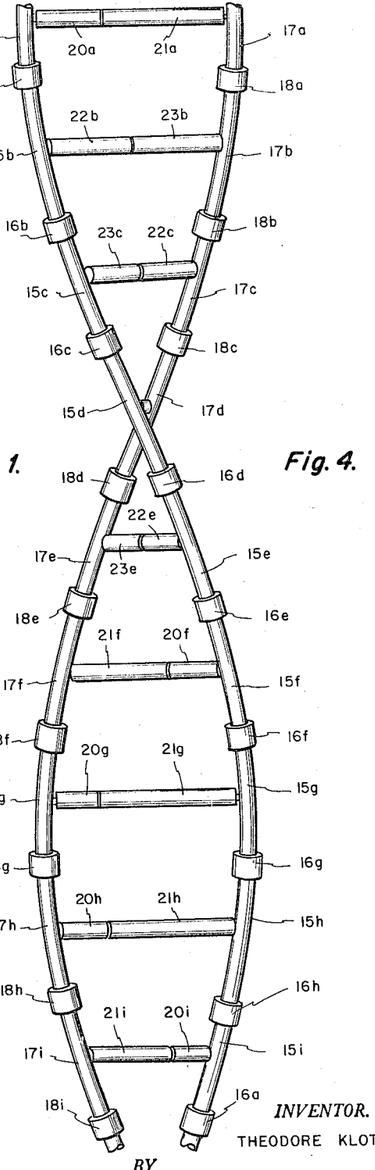
FIG. 4 is an illustration of the model of FIG. 1 twisted into a helical configuration.

FIG. 4 is a view of the model shown in FIG. 1 twisted into a helix to represent the actual shape of the DNA molecule. Since the strands of the helix are formed by a series of contiguous resilient polyethylene sugar members 15 and since the phosphate members 16 are made of a flexible material such as rubber, the model may be twisted into a helix that will maintain its shape without unwinding.

Figure 5:
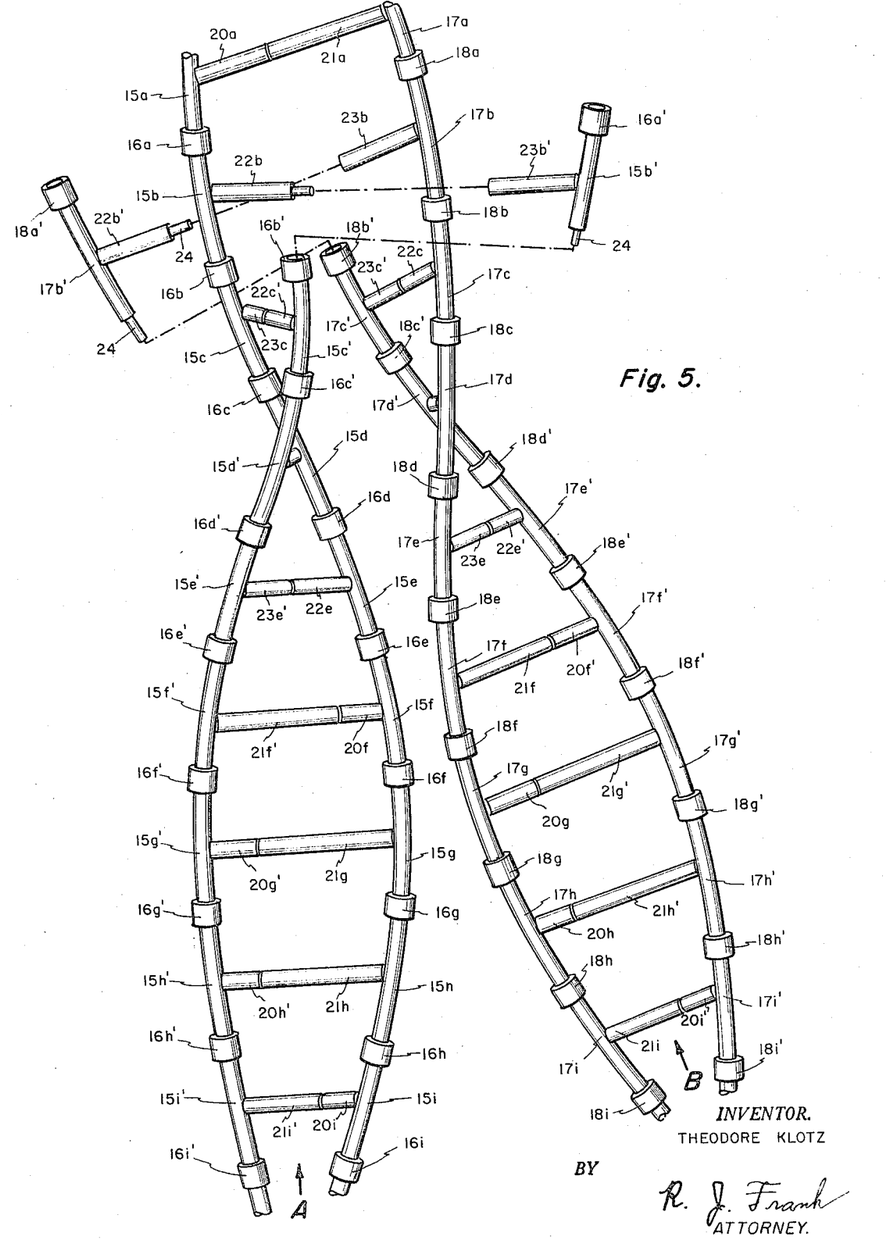
FIG. 5 shows a model of a DNA molecule splitting into two parts.

One of the most important properties of the DNA molecule is its ability to divide in two and make exact copies of itself. This process may be demonstrated by splitting the DNA model at the junction of the bases in each purine-pyrimidine bond and joining a free nucleotide assembly to each of the nucleotides in the original molecule. This is shown in FIG. 5 which illustrates a model of a DNA molecule in the process of duplicating itself by the formation of two new molecules, A and B. At the lower part of the A molecule, previously free nucleotides (represented by elements having primed reference characters) are shown joined to the nucleotides forming part of the original DNA model of FIG. 4. For example, the previously free nucleotide assembly comprising sugar member 15i', phosphate element 16i' and thymine element 21i' has been joined to the nucleotide in the original DNA model (FIG. 4) composed of sugar element 15i, phosphate element 16i and adenine element 20i. The adenine-thymine elements 20i and 21i' introduce the same genetic code letters into the A moleuule being formed as existed in the original molecule of FIG. 4 and are located at the same position in the helix. Similarly, the previously free nucleotide assembly composing sugar member 17i', phosphate element 18i' and adenine element 20i' are joined to the nucleotide assembly 17i, 18i and 21i in the original molecular model. In the same way, the nucleotides having components identified by the letters c and h have been duplicated so that the portion of the new A and B molecules are exact copies of the corresponding portions of the molecule of FIG. 4 and represent the same genetic code.

At the upper part of FIG. 5, the molecular model of FIG. 4 has been divided at the junction between bases 22b and 23b but the adenine-thymine elements 20a and 21a have not yet been split. In order to complete the duplication of the original model, the nucleotide consisting of sugar element 17b', phosphate 18a' and guanine 22b' must be connected by pins 24 to sugar element 17c' and to cytosine element 23b. Similarly, the free nucleotide consisting of phosphate element 16a', sugar member 15b' and cytosine element 23b' is coupled to sugar member 15c' and guanine 22b.

Demonstration of the duplication of the DNA molecules is facilitated in my kit by employing crimped pins 24' to represent the strong unbroken bonds between the base and sugar elements and by using pins 24 to represent the relatively weak bonds connecting the nucleotides to each other. In this way, the model can be easily split down the middle where the base elements join but will not inadvertently come apart at the juncture of the base and sugar elements.

While the molecule simulated in FIG. 4 shows a particular genetic code which has been duplicated in the molecules A and B of FIG. 5, it shall be understood that the kit may be used to build models of molecules having any desired arrangement of bases. Further, by employing base elements of appropriate length and configuration, it is possible to build models of DNA molecules in which the normal genetic code is not present. Such models are useful in studying the causes and effects of mutations in the DNA molecule.

Figure 6:
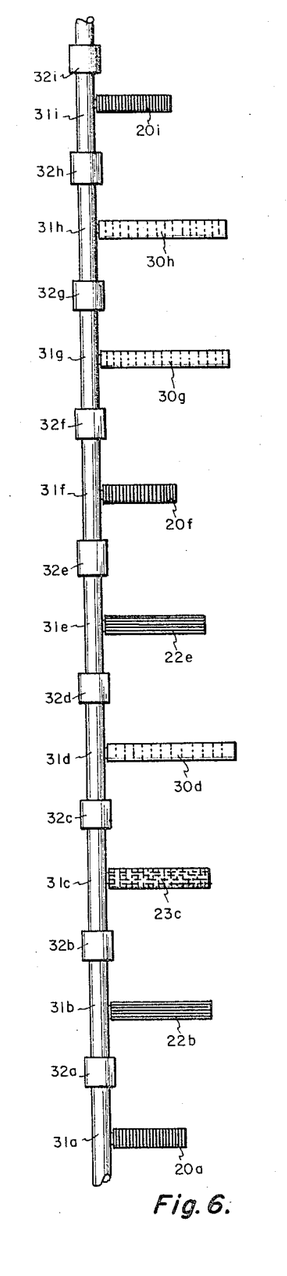
FIG. 6 depicts a model of a messenger-RNA molecule.

In addition to duplicating itself, the DNA molecule produces messenger RNA which is substantially identical to DNA except that the sugar units are ribose instead of deoxyribose and thymine is replaced by uracil. FIG. 6 illustrates a model of a typical strand of RNA in which the sugar units (ribose) are represented by resilient cylindrical members 31a to 31i and the phosphates by hollow cylindrical elements 32a to 32i. The sugar and phosphate elements 31 and 32 are identical to those shown in FIGS. 2a and 2b respectively, except that the sugar (ribose) elements may have a distinctive marking such as color to distinguish them from the deoxyribose elements in the DNA model. The base elements, adenine 20, guanine 22, and cytosine 23 are identical to those shown in the DNA models of FIGS. 1, 4 and 5 and in FIG. 2c. Base elements 30 represent uracil and are of the same length and diameter as element 21 representing thymine in the DNA model. Uracil element 30 may be distinguished by coloring it purple as indicated by the shading of FIG. 6. The messenger RNA model is assembled with pins 24 (not shown) in the same manner as the DNA model illustrated in FIG. 3.

The transfer-RNA molecules are simulated by cylindrical solid rods 34 (FIG. 7) of polyethylene having bands 35 marked on their surface to indicate the phosphate units. The sections of the rod adjacent bands 35 represent the sugar units and have holes 36 drilled therein to receive the base elements. A notch 37, of predetermined configuration, is cut at the center of the rod opposite the center hole 36'. The notch is shaped to receive a block representing a specific amino acid and consequently each transfer-RNA unit can be connected to only one amino acid block. For example, the notch 37 in the transfer-RNA rod of FIG. 7 will receive only the cylindrical amino acid block shown in FIG. 9a.

Figures 7, 8A, 8B, 8C, 9A, 9B, 9C:
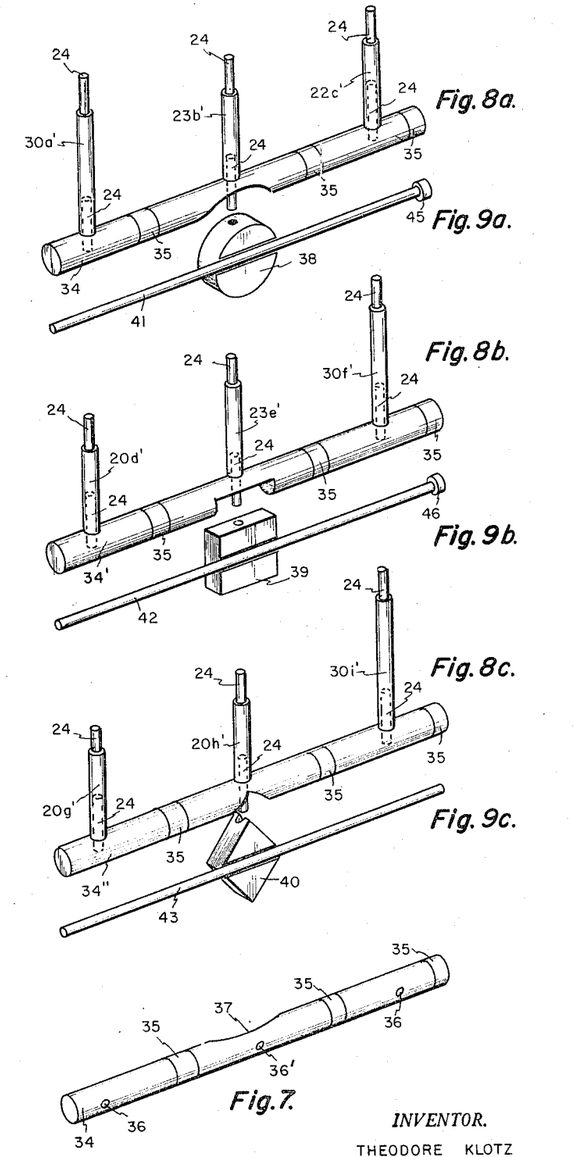
FIG. 7 shows a component of the kit used in constructing a model of a transfer-RNA molecule.
FIGS. 8a, 8b and 8c illustrate models of transfer-RNA molecules.
FIGS. 9a, 9b and 9c show components representing amino acids.

According to present theory, each amino acid is associated with one or more three letter codes formed by the bases adenine, uracil, guanine and cytosine. Referring to FIG. 8a, a model of a transfer-RNA molecule is shown which contains base elements 30a′ (uracil), 23b′ (cytosine), and 22e′ (guanine). These bases comprise a code which will cause a specific amino acid to attach itself to the transfer-RNA, and therefore, in the model, these bases are associated with the cylindrical block 38 of FIG. 9a representing one of the amino acids. The holes 36 at the ends of the transfer-RNA rod 34 are just deep enough to permit the use of a pin 24 to attach the base elements whereas the hole 36′ at the center goes completely through the tube and permits pin 24 to fit into a hole in the amino acid block 38. Similarly, FIG. 8b illustrates a model of a transfer-RNA molecule in which base elements 20d′ (adenine) 23e′ (cytosine) and 30f′ (uracil) attached to rod 34′ correspond to an amino acid illustrated by a square block 39, and FIG. 8c shows a transfer-RNA model in which bases 20g′ (adenine), 20h′ (adenine) and 30i′ (uracil) attached to rod 34″ correspond to an amino acid illustrated by diamond shaped block 40. Each of the amino acid block 38–40 is provided with a slot extending parallel to the transfer-RNA rod. These slots receive plastic rods 41–43 which, together with collars 45 and 46, represent the peptide bonds between the amino acids. The transfer-RNA assemblies may be constructed of separate sugar and phosphate elements but, for ease of assembly, this has not been done in the preferred form of my invention.

There is considerable uncertainty at the present time as to the genetic code for each of the amino acids. However, the following table, taken from an article by Nerenberg in the March 1963 issue of The Scientific American, indicates some of the code words believed associated with certain amino acids. In this table adenine is represented by the letter A, uracil by U, guanine by G and cytosine by C. Transfer-RNA molecules containing these code words may be simulated by attaching the listed base elements to the rod keyed to the corresponding amino acid.

TABLE

| Amino Acid | RNA Code Words | Base Elements |
| --- | --- | --- |
| Alanine | CCG | 23, 23, 22 |
| Arginine | CGC | 23, 22, 23 |
| Asparagine | ACA | 20, 23, 20 |
| Aspartic Acid | GUA | 22, 30, 20 |
| Cysteine | UUG | 30, 30, 22 |
| Glutamic Acid | GAA | 22, 20, 20 |
| Glutamine | ACA | 20, 23, 20 |
| Glycine | UGG | 30, 22, 22 |
| Histidine | ACC | 20, 23, 23 |
| Isoleucine | UAU | 30, 20, 30 |
| Leucine | UUG | 30, 30, 22 |
| Lysine | AAA | 20, 20, 20 |
| Methionine | UGA | 30, 22, 30 |
| Phenylalanine | UUU | 30, 30, 30 |
| Proline | CCC | 23, 23, 23 |
| Serine | UCU | 30, 23, 30 |
| Threonine | CAC | 23, 20, 23 |
| Tryptophan | GGU | 22, 22, 30 |
| Tyrosine | AUU | 20, 30, 30 |
| Valine | UGU | 30, 22, 30 |

Figure 10:
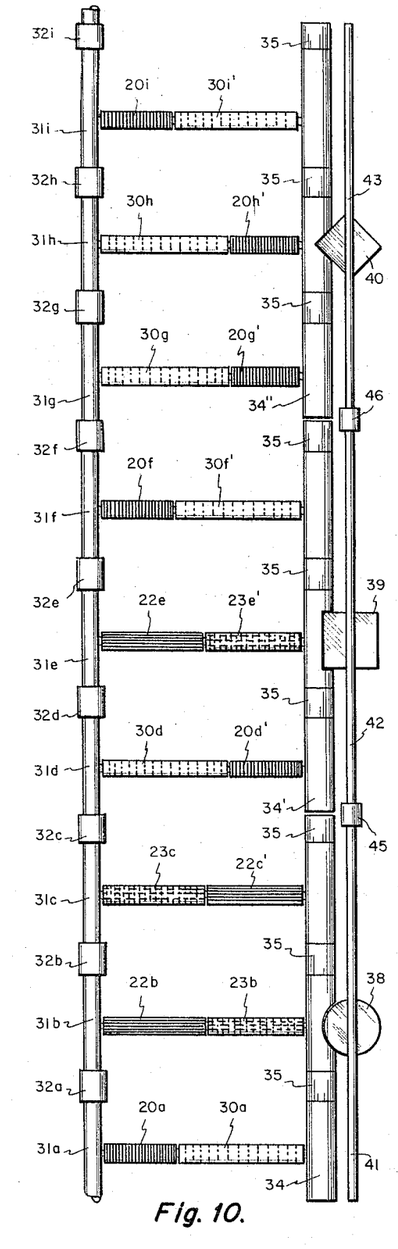
FIG. 10 illustrates the manner in which amino acids are linked to form protein.

After the amino acids have attached themselves to the corresponding transfer-RNA molecules, the transfer-RNA molecules together with the associated amino acid, converge on the messenger-RNA molecule (FIG. 6) and attach themselves in an order determined by the transfer and messenger-RNA base elements. This is indicated in FIG. 10 in which the transfer-RNA assemblies of FIGS. 9a–9c have been joined to the messenger-RNA assembly of FIG. 6 so as to form adenine-uracil and guanine-cytosine bonds. In the example illustrated, the transfer-RNA assemblies can be connected to the messenger-RNA only in one way and therefore the amino acid blocks 38, 39, and 40 are arranged in the specific order required to simulate the polypeptide link spelled out by the genetic code in the messenger-RNA. While even the simplest protein is made of a polypeptide chain consisting of many more than three amino acids, FIG. 10 is illustrative of the method of assembling more complex amino acid chains using the components provided with my kit.

Figure 11A:
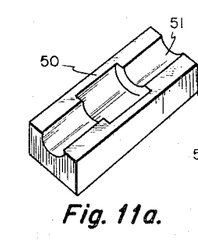
FIGS. 11a and 11b show a component simulating an enzyme and the method of securing the component to the DNA model.
Figure 11B:
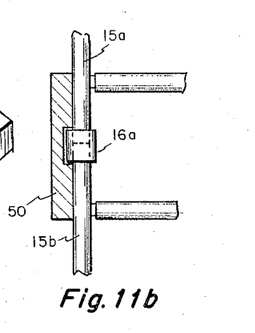

As has been previously described, the coupling of the sugar and phosphate units takes place in the presence of an enzyme which acts as a catalyst. FIG. 11a depicts the element 50 used to simulate the enzyme. It consists of a rectangular section having a length equal to the distance between the base elements and a semicircular longitudinal groove 51 which is of such character that it fits tightly over the sugar elements 15 and 17. FIG. 11b indicates the manner in which it is connected to two adjacent sugar members 15a and 15b having a phosphate link 16a of the type shown in FIG. 1. As shown, the enzyme element extends between base elements 20a and 22b.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A model of a nucleic acid molecule comprising
   (a) first and second strands, each of said strands being composed of
      (1) a plurality of elongated resilient members for simulating sugar units
      (2) means connecting said resilient sugar-simulating members to each other and
      (3) a plurality of spaced flexible elements affixed to said resilient sugar-simulating members, said flexible elements simulating phosphate units,
   (b) a plurality of rigid elongated elements for simulating the purine-pyrimidine units of said nucleic acid molecule, and
   (c) means coupling one of said purine-pyrimidine simulating elements between each sugar-simulating member in said first strand and a corresponding sugar-simulating member in said second strand, the resulting nucleic acid model being adapted for twisting into a helical configuration.

2. A model of a nucleic acid molecule comprising
   (a) first and second strands, each of said strands being composed of
      (1) a plurality of elongated cylindrical resilient members for simulating sugar units, said sugar-simulating members having first and second ends,
      (2) means connecting the first end of each of said sugar-simulating members to the second end of another of said sugar-simulating members, and
      (3) a plurality of spaced flexible elements for simulating phosphate units, each of said phosphate-simulating elements being affixed to the first and second ends of adjacent sugar-simulating members,
   (b) a plurality of rigid elongated elements for simulating the purine-pyrimidine units of said nucleic acid molecule, and
   (c) means coupling one of said purine-pyrimidine simulating elements between each sugar-simulating member in said first strand and a corresponding sugar-simulating member in said second strand, the resulting nucleic acid model being adapted for twisting into a helical configuration.

3. A model of a nucleic acid molecule comprising
   (a) first and second strands, each of said strands being composed of
      (1) a plurality of elongated cylindrical resilient members for simulating sugar units, said sugar-simulating members having first and second ends, (2) means connecting the first end of each of said sugar-simulating members to the second end of another of said sugar-simulating members, and (3) a plurality of spaced flexible elements for simulating phosphate units, each of said phosphate-simulating elements being affixed to the first and second ends of adjacent sugar-simulating members, (b) a plurality of rigid elongated members for simulating the purine-pyrimidine units of said nucleic acid molecule, each of said purine-pyrimidine members being comprised of first and second cylindrical elements simulating base units, and (c) means coupling said first and second base simulating elements together and to coresponding sugar-simulating members in said first and second strands, the resultant nucleic acid model being adapted for twisting into a helical configuration.

4. A model of nucleic acid molecule comprising
(a) first and second strands, each of said strands being composed of
(1) a plurality of hollow elongated cylindrical resilient members for simulating sugar units, said sugar-simulating members having first and second ends,
(2) a plurality of cylindrical pins fitting into the bores of said hollow sugar-simulating members, said pins connecting the first end of each of said sugar-simulating members to the second end of another of said sugar-simulating members,
(3) a plurality of spaced hollow cylindrical flexible elements for simulating phosphate units, each of said phosphate simulating elements surrounding the first and second ends of adjacent sugar-simulating members,
(b) first, second, third and fourth groups of rigid elongated cylindrical elements having first and second ends for simulating the base units of said nucleic acid molecule, the combined length of a base-simulating element of said first group and a base-simulating element of said second group being equal to the combined length of a base-simulating element of said third group and a base-simulating element of said fourth group,
(c) means coupling one end of each base-simulating element of said first group to one end of a base-simlating element of said second group and means coupling one end of each base-simulating element of said third group to one end of a base-simulating element of said fourth group, and
(d) means coupling the other ends of the base-simulating elements of said first and third groups to individual selected sugar-simulating members of said first strand and means coupling the other ends of the base-simulating elements of said second and fourth group to corresponding selected sugar-simulating members of said second strand, the resultant nucleic acid model being adapted for twisting into a helical configuration.

5. A model of a nucleic acid molecule comprising
(a) first and second strands, each of said strands being composed of
(1) a plurality of hollow elongated cylindrical resilient members for simulating sugar units, said sugar-simulating members having first and second ends and a radial aperture located substantially midway between said ends,
(2) a first plurality of cylindrical pins fitting into the bores of said hollow sugar-simulating members, said pins connecting the first end of each of said sugar-simulating members to the second end of another of said sugar-simulating members,
(3) a plurality of spaced hollow cylindrical flexible elements for simulating phosphate units, each of said phosphate-simulating elements surrounding the first and second ends of adjacent sugar-simulating members,
(b) first, second, third and fourth groups of rigid elongated hollow cylindrical elements having first and second ends for simulating the base units of said nucleic acid molecule, the combined length of a base-simulating element of said first group and a base-simulating element of said second group being equal to the combined length of a base-simulating element of said third group and a base-simulating element of said fourth group,
(c) a second plurality of cylindrical pins fitting into the bores of said base-simulating element for coupling one end of each base-simulating element of said first group to one end of a base-simulating element of said second group and for coupling one end of a base-simulating element of said third group to one end of a base-simulating element of said fourth group, and
(d) a third plurality of cylindrical pins fitting into the bores of said base-simulating elements and the radial apertures in said sugar-simulating members, said third plurality of pins coupling the other ends of the base-simulating elements of said first and third groups to individual selected sugar-simulating members of said first strand and means coupling the other ends of the base-simulating elements of said second and fourth group to corresponding selected sugar-simulating members of said second strand, the resultant nucleic acid model being adapted for twisting into a helical configuration.

6. A model of a nucleic acid molecule as defined in claim 5 wherein the base-simulating elements of said third and fourth groups are equal in length and the base-simulating elements of said first and second groups are shorter and longer respectively than those of said third and fourth groups.

7. A model of a nucleic acid molecule comprising
(a) a strand comprised of
(1) a plurality of elongated cylindrical resilient members for simulating sugar units, said sugar-simulating members having first and second ends,
(2) means connecting the first end of each of said sugar-simulating members to the second end of another of said sugar-simulating members, and
(3) a plurality of spaced flexible elements for simulating phosphate units, each of said phosphate-simulating elements being affixed to the first and second ends of adjacent sugar-simulating members,
(b) a plurality of rigid elongated elements for simulating the base units of said nucleic acid molecule, and
(c) means coupling each of said base-simulating elements to a selected sugar-simulating member of said strand.

8. A model of a nucleic acid molecule comprising
(a) a strand comprised of
(1) a plurality of hollow elongated cylindrical resilient members for simulating sugar units, said sugar-simulating members having first and second ends and a radial aperture located substantially midway between said ends,
(2) a first plurality of cylindrical pins fitting into the bores of said hollow sugar-simulating members, said pins connecting the first end of each of said sugar-simulating members to the second end of another of said sugar-simulating members,
(3) a plurality of spaced hollow cylindrical flexible elements for simulating phosphate units, each of said phosphate-simulating elements surrounding the first and second ends of adjacent sugar-simulating members, (b) a plurality of rigid elongated elements for simulating the base units of said nucleic acid molecule, and (c) a second plurality of pins fitting into the bores of said base-simulating elements and the radial aperture in said sugar-simulating members, said pins coupling each of said base-simulating elements to a selected sugar-simulating member of said strand.

9. A model of a transfer-RNA molecule comprising (a) an elongated cylindrical rod for simulating first, second, and third sugar units, said rod having first, second, and third radial apertures in the portions thereof representing said first, second, and third sugar units respectively and a notch having a predetermined shape formed in the portion representing said second sugar unit, (b) a plurality of rigid elongated hollow cylindrical elements for simulating the base units of said transfer-RNA molecule, and (c) a plurality of pins fitting into the bases of said base-simulating elements and the radial apertures in said cylindrical rod, said pins coupling each of said base-simulating elements to a selected sugar-simulating portion of said rod.

10. A molecular model comprising (a) a transfer-RNA portion comprised of
   (1) an elongated cylindrical rod for simulating first, second, and third sugar units, said rod having first, second and third radial apertures in the portions thereof representing said first, second, and third sugar units respectively and a notch having a predetermined shape formed in the portion representing said second sugar unit, said first and third apertures extending partially into said rod and said second aperture extending entirely through said rod,
   (2) a plurality of rigid elongated hollow cylindrical elements for simulating the base units of said transfer-RNA molecule, and
   (3) a plurality of cylindrical pins fitting into the bases of said base-simulating elements and the radial apertures in said cylindrical rod, said pins coupling each of said base-simulating elements to a selected sugar-simulating portion of said rod, and (b) a block keyed to fit in the notch formed in said rod for simulating an amino acid, said amino acid simulating block being connected to said rod by the cylindrical pin extending through the second radial aperture in said rod into an aperture located in the side of said block.

11. A molecular model as defined by claim 10 wherein said amino acid block is provided with a grooved section to receive a cylindrical rod simulating a peptide link.

12. A model of a nucleotide comprising (a) an elongated resilient cylindrical member for simulating a sugar unit, said sugar-simulating member having first and second ends and a radial aperture located substantially midway between said ends, (b) a hollow cylindrical flexible element for simulating a phosphate unit surrounding one end of said sugar-simulating units, (c) a rigid elongated hollow cylindrical element for simulating a base unit, and (d) a substantially cylindrical pin for coupling said base-simulating element to said sugar-simulating member, one end of said pin being crimped to form a flat transversely elongated portion having a width greater than the diameter of the radial aperture in said sugar-simulating member, the crimped end of said pin passing through said radial aperture only when said aperture is elongated by bending said resilient sugar-simulating member.

13. A molecular model construction kit comprising (a) a plurality of elongated resilient members for simulating sugar units, (b) a plurality of flexible elements adapted to be affixed to said sugar-simulating elements, said flexible elements simulating phosphate units, (c) first, second, third and fourth groups of rigid elongated cylindrical elements having first and second ends for simulating the base units of said nucleic acid molecule, the combined length of a base-simulating element of said first group and a base-simulating element of said second group being equal to the combined length of a base-simulating element of said third group and a base-simulating element of said fourth group, and (d) means for coupling said sugar-simulating member and said base-simulating member to each other to form a model of a nucleic acid molecule.

14. A molecular model construction kit comprising (a) a plurality of hollow elongated cylindrical resilient members for simulating sugar units, said sugar-simulating members having first and second ends and a radial aperture located substantially midway between said ends, (b) a plurality of flexible hollow cylindrical elements adapted to be affixed to said sugar-simulating units, said flexible elements simulating phosphate units, (c) first, second, third and fourth groups of rigid elongated hollow cylindrical elements having first and second ends for simulating the base units of said nucleic acid molecule, the combined length of a base-simulating element of said first group and a base-simulating element of said second group being equal to the combined length of a base-simulating element of said third group and a base-simulating element of said fourth group, and (d) a plurality of substantially cylindrical pins fitting into the bore of said base-simulating elements and into the bore and radial aperture of said sugar-simulating members for coupling said base and sugar-simulating members to each other to form a model of a nucleic acid molecule.

15. A molecular model construction kit comprising (a) a plurality of hollow elongated cylindrical resilient members for simulating sugar units, said sugar-simulating members having first and second ends and a radial aperture located substantially midway between said ends, (b) a plurality of flexible hollow cylindrical elements adapted to be affixed to said sugar-simulating units, said flexible elements simulating phosphate units, (c) first, second, third and fourth groups of rigid elongated hollow cylindrical elements having first and second ends for simulating the base units of said nucleic acid molecule, the combined length of a base-simulating element of said first group and a base-simulating element of said second group being equal to the combined length of a base-simulating element of said third group and a base-simulating element of said fourth group, (d) a plurality of elongated cylindrical rods for simulating first, second and third sugar units, said rods having first, second, and third radial apertures in the portions thereof representing said first, second, and third sugar units respectively and a notch having a predetermined shape formed in the portion representing said second sugar unit, (e) a plurality of blocks keyed to fit in the notches formed in corresponding ones of said rods, said blocks representing amino acids, and (f) a plurality of cylindrical pins for coupling said sugar, base and amino-acid simulating elements together.

16. A molecular model construction kit comprising (a) a plurality of hollow elongated cylindrical resilient members for simulating sugar units, said sugar-simulating members having first and second ends and a radial aperture located substantially midway between said ends,
(b) a plurality of flexible hollow cylindrical elements adapted to be affixed to said sugar-simulating units, said flexible elements simulating phosphate units,
(c) first, second, third and fourth groups of rigid elongated hollow cylindrical elements having first and second ends for simulating the base units of said nucleic acid molecule, the combined length of a base-simulating element of said first group and a base-simulating element of said second group being equal to the combined length of a base-simulating element of said third group and a base-simulating element of said fourth group,
(d) a first plurality of cylindrical pins fitting into the bores of said base and sugar-simulating members, said pins being adapted for coupling said base members together and for coupling said sugar members together, and
(e) a second plurality of substantially cylindrical pins for coupling said base and sugar-simulating members together, one end of each of said second plurality of pairs being crimped to form a flat transversely elongated portion having a width greater than the diameter of the radial apertures in said sugar-simulating members, the crimped ends of said pin passing through said radial aperture only when said aperture is elongated by bending said resilient sugar-simulating member.

17. A molecular model construction kit comprising
(a) a plurality of hollow elongated cylindrical resilient members for simulating sugar units, said sugar-simulating members having first and second ends and a radial aperture located substantially midway between said ends,
(b) a plurality of flexible hollow cylindrical elements adapted to be affixed to said sugar-simulating units, said flexible elements simulating phosphate units,
(c) first, second, third and fourth groups of rigid elongated hollow cylindrical elements having first and second ends for simulating the base units of said nucleic acid molecule, the combined length of a base-simulating element of said first group and a base-simulating element of said second group being equal to the combined length of a base-simulating element of said third group and a base-simulating element of said fourth group,
(d) a first plurality of elongated cylindrical rods for simulating first, second and third sugar units, said rods having first, second, and third radial apertures in the portions thereof representing said first, second, and third sugar units respectively and a notch having a predetermined shape formed in the portion representing said second sugar unit,
(e) a plurality of blocks shaped to fit in the notches formed in corresponding rods for representing amino acids, each of said blocks having an aperture in one side thereof and a grooved surface, said groove being perpendicular to the axis of said aperture,
(f) a plurality of cylindrical pins for coupling said sugar, base and amino-acid simulating elements together,
(g) a second plurality of elongated cylindrical rods, each of said rods having a diameter substantially equal to the width of the grooves in said amino acid blocks, and
(h) a plurality of collars, each of said collars fitting over the end of one of said second plurality of cylindrical rods.

References Cited by the Examiner
UNITED STATES PATENTS

| | | | |
|---|---|---|---|
| 814,367 | 3/1906 | Given | 46—29 |
| 1,851,159 | 3/1932 | Dodge | 35—18 |
| 2,218,078 | 10/1940 | Assmuth et al. | 35—20 |

EUGENE R. CAPOZIO, *Primary Examiner.*

H. S. SKOGQUIST, *Assistant Examiner.*